Oct. 19, 1971  G. R. HELD  3,613,472

HONING GEAR ASSEMBLY

Filed Aug. 12, 1970

INVENTOR
GERHARD R. HELD

BY *Cullen, Settle, Sloman & Cantor*

ATTORNEYS

Oct. 19, 1971  G. R. HELD  3,613,472
HONING GEAR ASSEMBLY
Filed Aug. 12, 1970  2 Sheets-Sheet 2

INVENTOR
GERHARD R. HELD
BY Cullen, Settle, Sloman & Cantor
ATTORNEYS

_United States Patent Office_

3,613,472
Patented Oct. 19, 1971

3,613,472
HONING GEAR ASSEMBLY
Gerhard R. Held, 22644 Shiell Drive,
Mount Clemens, Mich. 48043
Filed Aug. 12, 1970, Ser. No. 63,121
Int. Cl. F16h 55/12; B24b 41/00; B24d 5/00
U.S. Cl. 74—411                                    3 Claims

ABSTRACT OF THE DISCLOSURE

A honing gear assembly comprising a backing plate, a gear plate, and a cover plate, all bolted together, and mounted on a drive spindle hub, with pin and bushing connections between the backing plate and the gear plate, with the pins of such connections being received in blind sockets of the cover plate, with the holes of the gear plate being lined with shock absorbing bushings for absorbing shocks transmitted for the gear plate to the backing plate and thus to the drive spindle hub.

GENERAL DESCRIPTION

This application discloses a honing gear assembly comprising among other parts, a backing plate, and a honing gear plate, characterized by the inclusion of shock absorbing pin and bushing type connections between the honing gear plate and the backing plate, whereby shocks on the honing gear due to the honing action are not transmitted to the backing plate but are absorbed by the shock absorbing bushings of the pin and bushing connections.

A principal object of the present invention is to provide a novel assembly of simple form as described above, wherein pin and bushing connections connect the backing plate and the honing gear plate, with the bushings being of shock absorbing character, whereby shocks due to the honing action are not transmitted by the honing gear plate to the backing plate and thus to the drive spindle hub on which the assembly is mounted, but rather are absorbed by the bushings which are of shock absorbing character.

Figure 1:
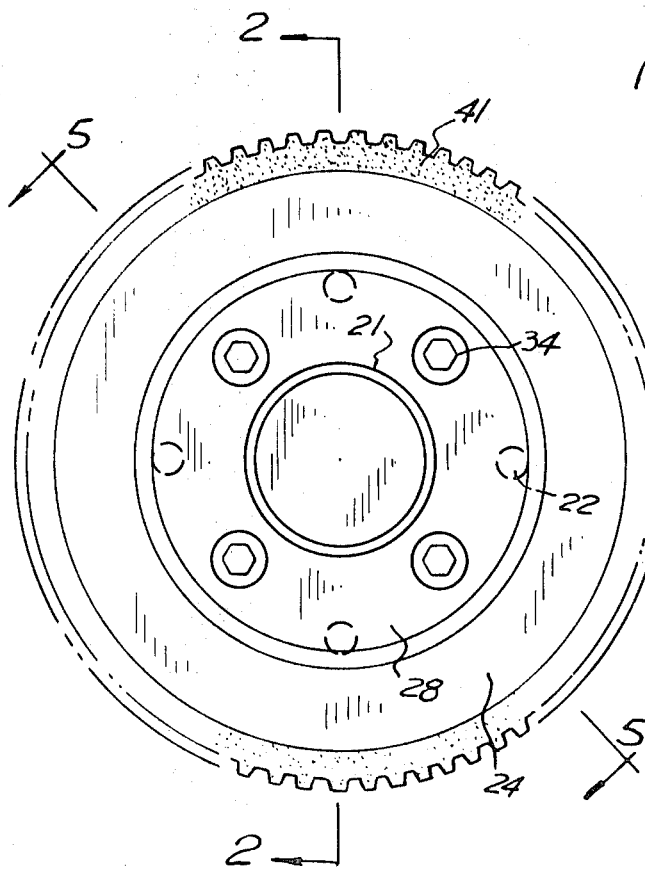
Figure 2:
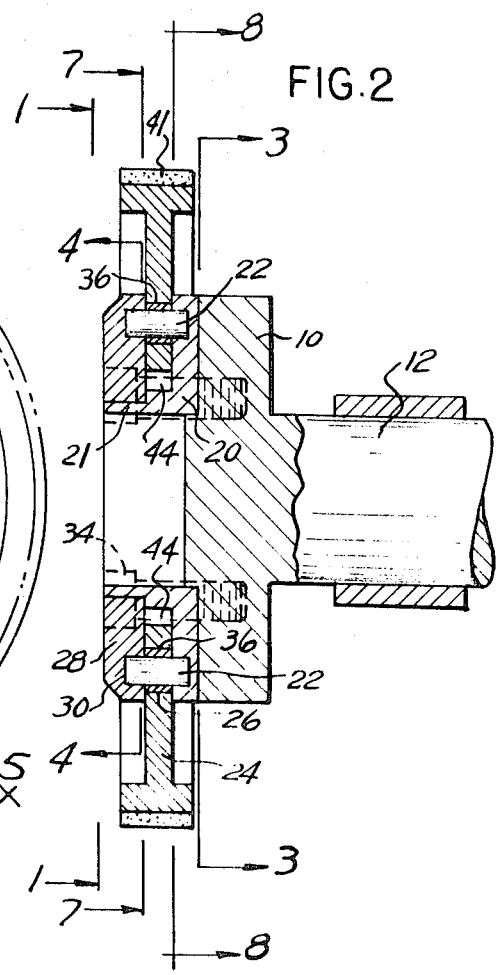
Figure 3:
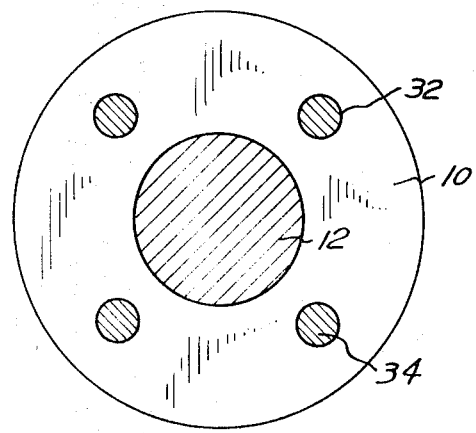
Figure 4:
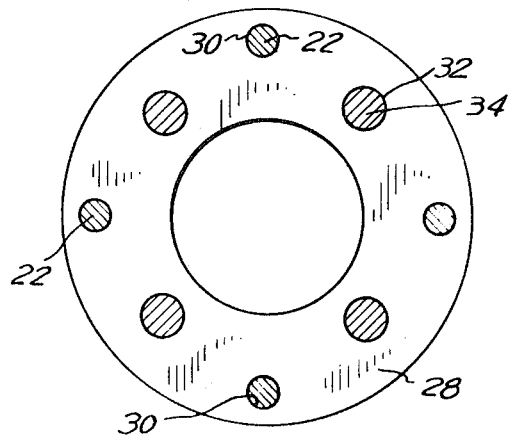
Figure 5:
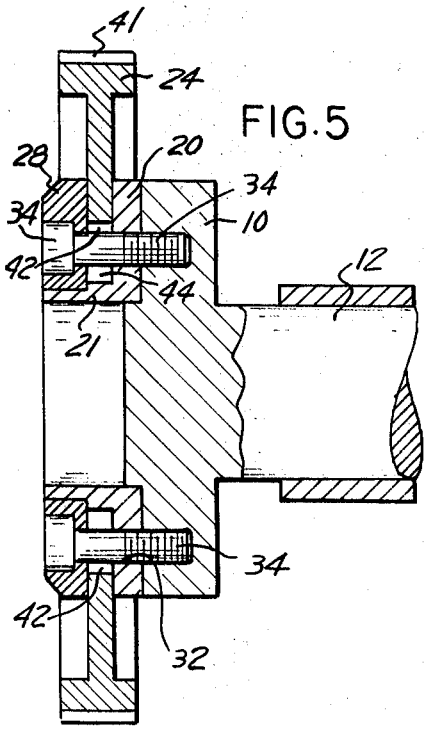
Figure 7:
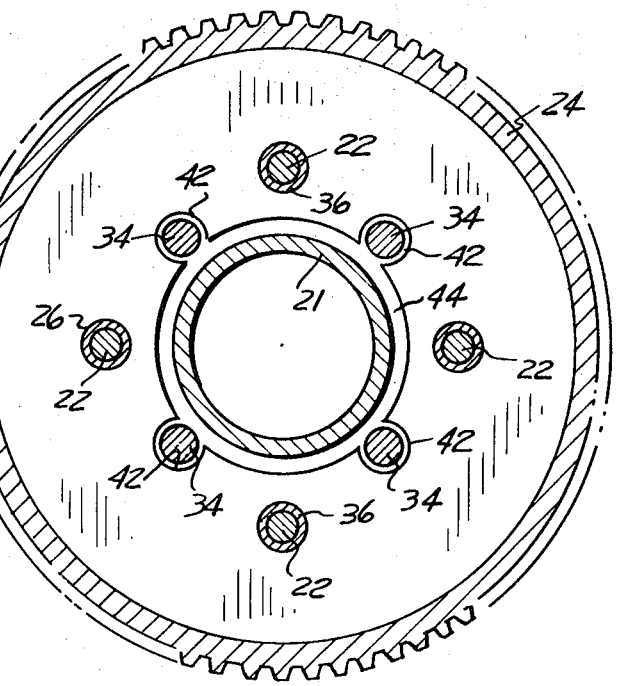
Figure 8:
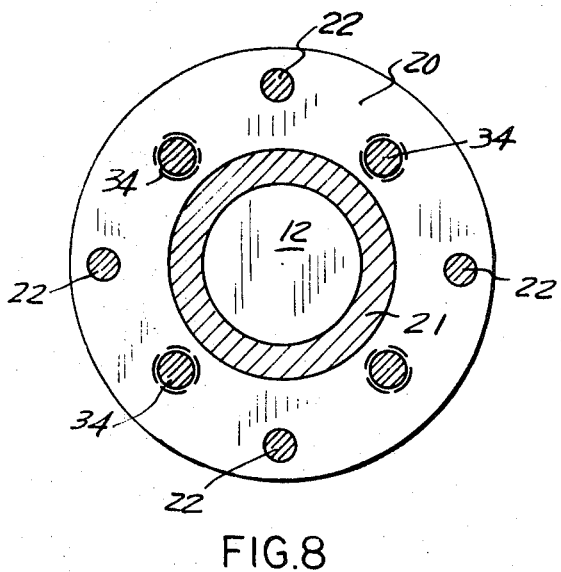
Figure 6:
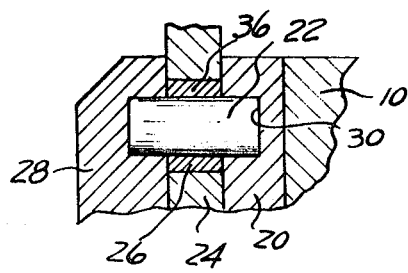

An embodiment of the invention is disclosed in the attached drawings. In these drawings:

FIG. 1 is an exposed front face view of the assembly;
FIG. 2 is a cross section as if on line 2—2 of FIG. 1;
FIG. 3 is a front face view of a spindle drive hub as if on line 3—3 of FIG. 2;
FIG. 4 is is a rear face view of a cover plate as if on line 4—4 of FIG. 2;
FIG. 5 is a cross section view as if on line 5—5 of FIG. 1;
FIG. 6 is an enlarged fragmentary cross-section view of the pin and bushing connections;
FIG. 7 is a front face view of a gear plate as if on line 7—7 of FIG. 2;
FIG. 8 is a front face view of a backing plate as if on line 8—8 of FIG. 2.

DETAILED DESCRIPTION

The honing gear assembly here shown is for attachment to a hub 10 of a drive spindle 12.

It comprises an annular backing plate 20 formed with a central hub 21 and having on its front face an annular series of longitudinally extending pins 22.

Against said front face of backing plate 20 is an annular honing gear plate 24 telescoped over hub 21 and having an annular series of longitudinally extending through holes 26, with each hole 26 receiving a pin 22 of the backing plate 20 projected through hole 26.

Against the front face of the gear plate 24 is an annular cover plate 28 also telescoped over hub 21. Gear plate 24 with abrasive peripheral surfaces 41 is thus between plates 20 and 28. The rear face of cover plate 28 has an annular series of blind sockets or recesses 30 receiving the ends of pins 22.

All three plates 20, 24 and 28, also have longitudinally extending alined holes 32 for receiving longitudinally extending bolts 34 which pass through the three plates and into tapped holes of the spindle hub 10 for securing the plates in assembly and for mounting the assembly.

Most significantly, the holes 26 of the gear plate 24 are lined with shock absorbing bushings 36 of nylon, rubber, neoprene, or the like, which absorb shocks on the pins 22 transmitted by the honing gear plate 24 through the pins 22 to the backing plate 20 and the hub 10.

Gear plate holes 32 are oversized with respect to bolts 34 thus defining clearances 42, FIGS. 5 and 7. Hub 21 is spaced inwardly of gear wheel central aperture defining clearance space 44, FIGS. 2 and 7. Thus the gear wheel is adapted for transverse movements relative to plates 20 and 28.

CONCLUSION

Now having described the honing gear assembly herein disclosed, reference should be had to the claims which follow.

I claim:
1. A honing gear assembly for attachment to a hub of a drive spindle wherein said assembly comprises:
an annular backing plate formed with a central hub and having on one face an annular series of longitudinally extending pins;
an annular honing gear plate telescoped over said latter hub and against the pin face of the backing plate and having an annular series of longitudinally extending holes, with each hole receiving a pin of the backing plate projecting through such hole; there being a layer of abrasive material over the peripheral edges of said gear plate;
an annular cover plate also telescoped over said hub, with the gear plate between the cover plate and the backing plate, and having on its gear plate engaging face an annular series of blind recesses receiving the ends of said pins projected through said gear plate holes;
with all three plates having in addition, longitudinally alined holes for receiving longitudinally extending bolts passing through the three plates and into the drive spindle hub for securing the plates in assembly and for mounting the assembly on the drive spindle hub;
said pin receiving holes of said gear plate being lined with plastic bushings of nylon, rubber, neoprene, or the like, which absorb shocks on the pins transmitted by the gear plate through the pins to the backing plate.

2. In the honing gear assembly of claim 1, said gear plate being loosely disposed over said backing plate hub, and the bolts being loosely disposed through said gear plate whereby the gear plate is adapted for transverse movement relative to said backing plate and cover plate.

3. In the honing gear assembly of claim 1, the gear plate having a central aperture oversized with respect to said backing plate hub, and having its bolt holes oversized with respect to said bolts whereby the gear plate is adapted for transverse movement relative to said backing plate and cover plate.

References Cited

UNITED STATES PATENTS

| 3,088,251 | 5/1963 | Davis | 51—206 |
| 3,290,084 | 12/1966 | Linblad | 51—206 |
| 3,353,306 | 11/1967 | Seymour et al. | 51—206 X |

LEONARD H. GERIN, Primary Examiner

U.S. Cl. X.R.

51—168, 206 (P); 74—447